(12) United States Patent
Harayama

(10) Patent No.: US 9,502,697 B2
(45) Date of Patent: Nov. 22, 2016

(54) BATTERY

(71) Applicant: Takashi Harayama, Toyota (JP)

(72) Inventor: Takashi Harayama, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/409,551

(22) PCT Filed: Apr. 19, 2013

(86) PCT No.: PCT/JP2013/061592
§ 371 (c)(1),
(2) Date: Dec. 19, 2014

(87) PCT Pub. No.: WO2014/002588
PCT Pub. Date: Jan. 3, 2014

(65) Prior Publication Data
US 2015/0179992 A1  Jun. 25, 2015

(30) Foreign Application Priority Data
Jun. 27, 2012  (JP) .................. 2012-143716

(51) Int. Cl.
H01M 2/04  (2006.01)
H01M 2/08  (2006.01)
H01M 2/06  (2006.01)
H01M 2/22  (2006.01)
H01M 2/30  (2006.01)

(52) U.S. Cl.
CPC ............ H01M 2/08 (2013.01); H01M 2/043 (2013.01); H01M 2/06 (2013.01); H01M 2/22 (2013.01); H01M 2/30 (2013.01); H01M 2/04 (2013.01); H01M 2220/20 (2013.01); H01M 2220/30 (2013.01)

(58) Field of Classification Search
None
See application file for complete search history.

(56) References Cited

U.S. PATENT DOCUMENTS

2011/0200870 A1* 8/2011 Kim ................. H01M 2/06
429/179

FOREIGN PATENT DOCUMENTS

JP  2012-028246 A  2/2012

OTHER PUBLICATIONS

Aota et al. (JP, 2012-028246) (a raw machine translation) (Abstract, Detailed Description & Drawings) (Feb. 9, 2012).*

* cited by examiner

Primary Examiner — Miriam Stagg
Assistant Examiner — Carmen Lyles-Irving
(74) Attorney, Agent, or Firm — Andrews Kurth Kenyon LLP

(57) ABSTRACT

A lid member of a battery case has a protruding section including an inside-outside direction an outside tapered surface, and a top surface between the inside tapered surface and the outside tapered surface. In a cross section, the area of a first imaginary area enclosed by a first line segment of the inside tapered surface, a first imaginary line extending downward from the top of the first line segment, and a second imaginary line extending in an inside-outside direction from the top surface, is smaller than the area of a second imaginary area enclosed by a second line segment of the outside tapered surface, a third imaginary line extending downward from the top of the second line segment, and the second imaginary line.

2 Claims, 5 Drawing Sheets

BATTERY

CROSS-REFERENCE TO RELATED APPLICATIONS

This is a US national phase application based on the PCT International Patent Application No. PCT/JP2013/061592 filed on Apr. 19, 2013, and claiming the priority of Japanese Patent Application No. 2012-143716 filed on Jun. 27, 2012, the entire contents of which are herewith incorporated by reference.

TECHNICAL FIELD

The present invention relates to a battery including a power generating element housed in a case and a lid member closing an opening of the case. More particularly, the present invention relates to a technique of a sealing structure provided with a current collector terminal member electrically connected to the power generating element and inserted through the lid member, and configured to seal the lid member and the current collector terminal member by interposing a gasket therebetween.

BACKGROUND ART

Batteries are used in various fields, for example, electronic devices such as a mobile phone and a personal computer, vehicles such as a hybrid vehicle and an electric vehicle. For example, a battery used in a vehicle field is configured such that a power generating element is enclosed in a casing of a can body and a lid member is welded to an opening of the casing to seal the opening. The lid member is formed with a through hole penetrating therethrough in a thickness direction of the lid member, and an insertion part of a current collector terminal member electrically connected to the power generating element extends out through the through hole.

As a method for fixing the current collector terminal member to the lid member, for example, Patent Document 1 discloses a technique that an insertion part of a cylindrical current collector terminal member is inserted through openings formed one each in an external connecting terminal, an insulator, the lid member, and a gasket, and further an upper end of the insertion part is deformed by caulking or riveting to extend radially outward relative to the center axis of the insertion part, providing temporary joining, and then the extended upper end of the insertion part and an upper surface of the external connecting terminal are welded and fixed to each other. In the battery disclosed in Patent Document 1, the gasket seals between the lid member and the current collector terminal member to suppress gas leakage from the opening of the lid member through which the insertion part of the current collector terminal member is inserted through.

RELATED ART DOCUMENTS

Patent Documents

Patent Document 1: JP-A-2012-28246

SUMMARY OF INVENTION

Problems to be Solved by the Invention

In order to further enhance the sealing strength for a current collector terminal member and its surrounding parts, recently, a noticeable seal structure is configured such that a lid member is provided, on a contact surface with a gasket, with a protrusion protruding in an axial direction (corresponding to a caulking direction) of an insertion part to compress a part of the gasket. This seal structure in which a part of the gasket includes a portion having a high-compression rate (hereinafter, referred to as "sealing part") has the following problems.

Specifically, during caulking or riveting, stress from the current collector terminal member acts on a side of the lid member, closer to the insertion part of the current collector terminal member (hereinafter, referred to as "inside") than the sealing part in a direction perpendicular to the caulking direction. Thus, in case the inside is not filled with the gasket, the lid member may be deformed inward under the influence of the stress, leading to caulking failure.

The present invention has been made in view of the circumstances to solve the above problems of the seal structure and has a purpose to provide a battery with a seal structure in which a gasket has a sealing part of a high compression rate, thereby suppressing caulking failure.

Means of Solving the Problems

To achieve the above purpose, one aspect of the invention provides a battery including: a power generating element; a case having an opening and housing the power generating element; a lid member welded to the opening of the case to close the opening; a current collector terminal member including: a current collector part having one end electrically connected to the power generating element and an other end facing the lid member; and an insertion part having one end electrically connected to the current collector part and an other end inserted through and extended out of the lid member in a vertical direction corresponding to a thickness direction of the lid member, the other end of the insertion part including a deformed part widened in diameter by caulking and electrically connected to an outer connecting terminal; and a gasket placed in contact with a lower surface of the lid member to seal between the lid member and the current collector terminal member, wherein the lid member includes a protrusion protruding downward from the lower surface in the vertical direction and surrounding the insertion part in a circumferential direction through the gasket, the protrusion has a top portion including: an inner tapered surface located on a side close to the insertion part in an inside-outside direction corresponding to a direction perpendicular to the vertical direction; an outer tapered surface located on an opposite side to the insertion part side in the inside-outside direction; and a top surface configured as a surface perpendicular to the vertical direction between the inner tapered surface and the outer tapered surface, in a vertical cross-section including an axis center of the insertion part in the vertical direction, an area of a first imaginary region surrounded by a first line segment defined in a vertical cross-section of the inner tapered surface, a first imaginary line extending downward from an uppermost point of the first line segment in the vertical direction, and a second imaginary line extending from a vertical cross-section of the top surface in the inside-outside direction is smaller than an area of a second imaginary region surrounded by a second line segment defined in a vertical cross-section of the outer tapered surface, a third imaginary line extending downward from an uppermost point of the second line in the vertical direction, and the second imaginary line.

The battery in the aforementioned aspect is configured such that the protrusion is formed with the tapered surfaces one each on the inside and the outside thereof. Since the tapered surfaces are present in the protrusion of the lid member, the gasket is easy to follow the lid member and thus a gap is less likely to occur. Furthermore, the area of the first imaginary region under the inner tapered surface on the inside is smaller than the area of the second imaginary region under the tapered surface on the outside. With this structure, even when the gasket is compressed by the protrusion during caulking, the region on the inside of the protrusion filled with the gasket earlier than the region on the outside of the protrusion. This can reduce the influence of the stress acting on the inside. Consequently, the lid member is suppressed from being deformed. It is to be noted that the uppermost point of the inner tapered surface and the uppermost point of the outer tapered surface are not necessarily equal in height. Further, the inner tapered surface and the outer tapered surface are not necessarily equal in inclined angle.

Moreover, preferably, the inner tapered surface and the outer tapered surface are equal in inclined angle and the length of the first line segment is shorter than the length of the second line segment. When the inclined angle is equal between the inner tapered surface and the outer tapered surface, the lengths of the line segments defining the tapered surfaces may be compared. This comparison can also provide the area of the first imaginary region smaller than the area of the second imaginary region.

Effects of the Invention

According to the above aspect of the present configuration, it is possible to provide a battery with a seal structure in which a gasket has a sealing part of a high compression rate, thereby suppressing caulking failure.

MODE FOR CARRYING OUT THE INVENTION

A detailed description of a preferred embodiment of a battery embodying the present invention will now be given referring to the accompanying drawings. In the following embodiment, the present invention is applied to a lithium ion secondary battery to be mounted in a hybrid vehicle.

[Structure of Battery]

Figure 1:
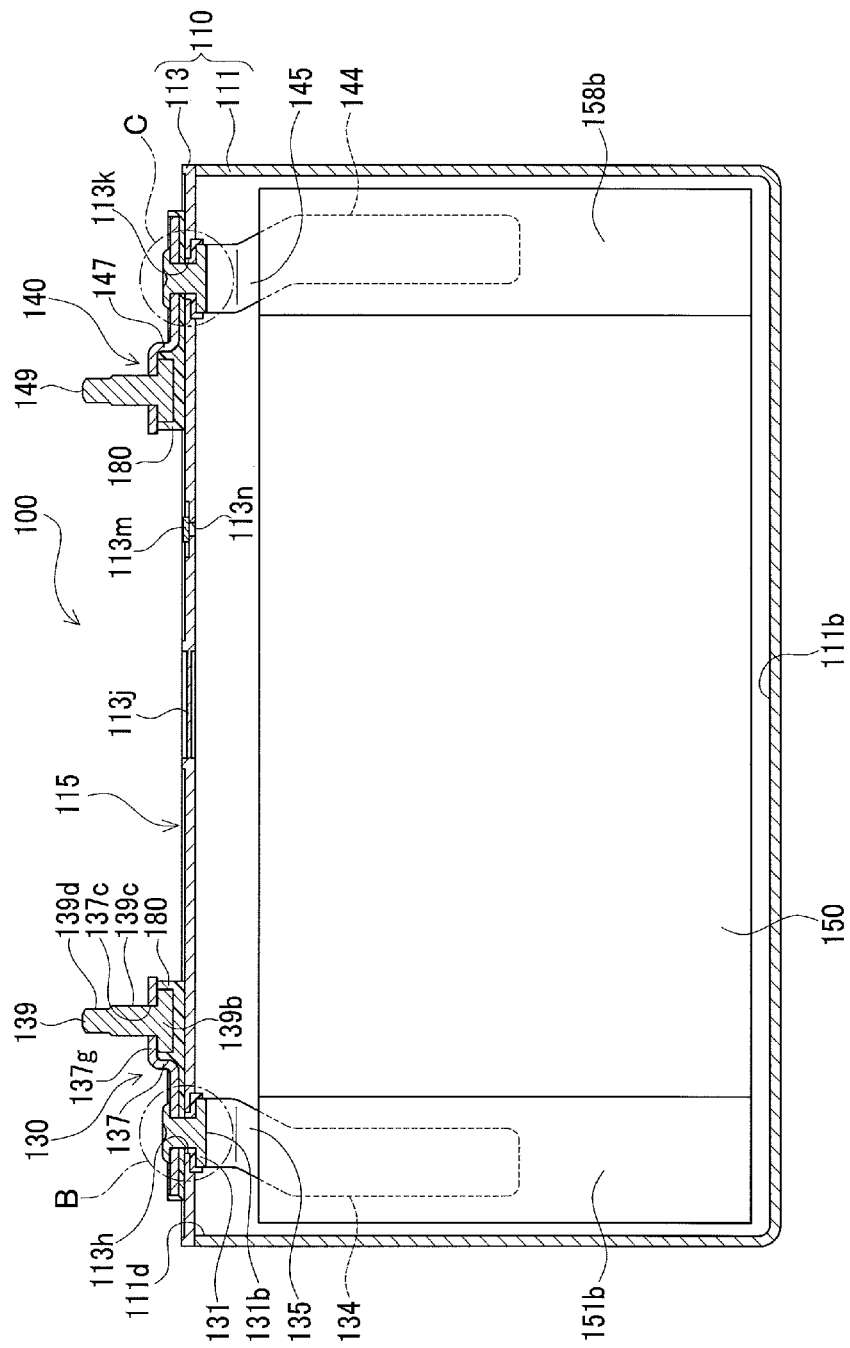
FIG. 1 is a vertical cross-section view of a battery of an embodiment.
Figure 2:
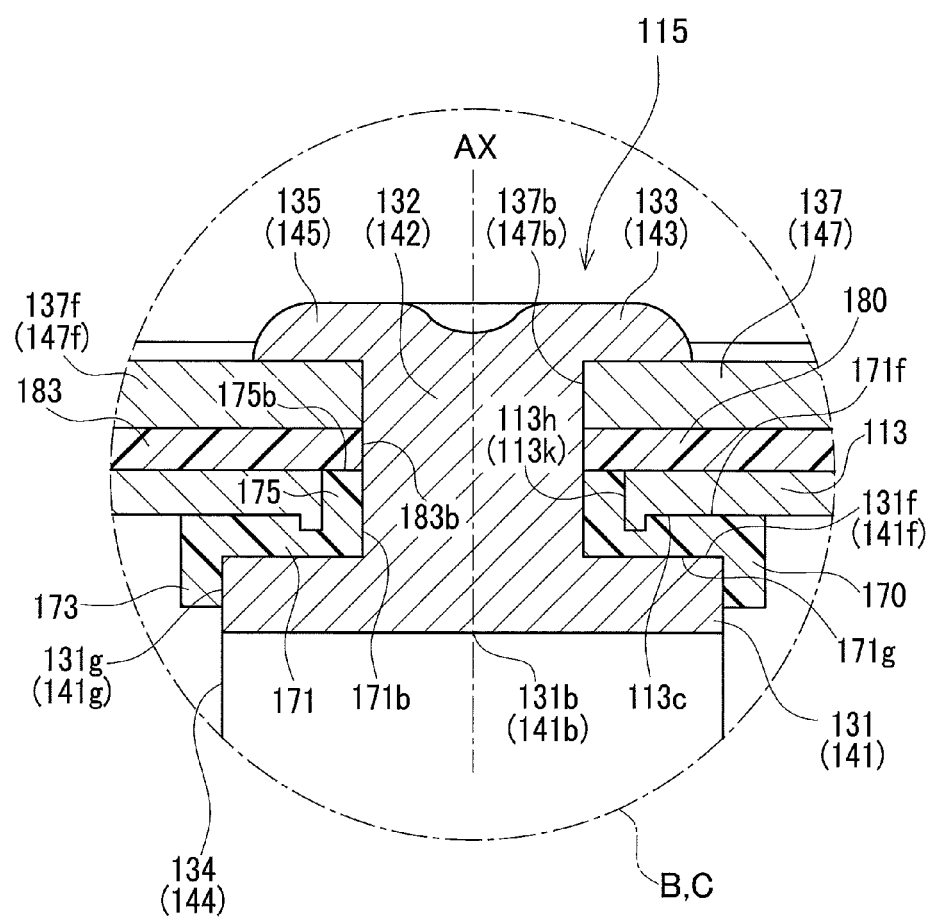
FIG. 2 is an enlarge view of a section B and a section C in FIG. 1.
Figure 3:
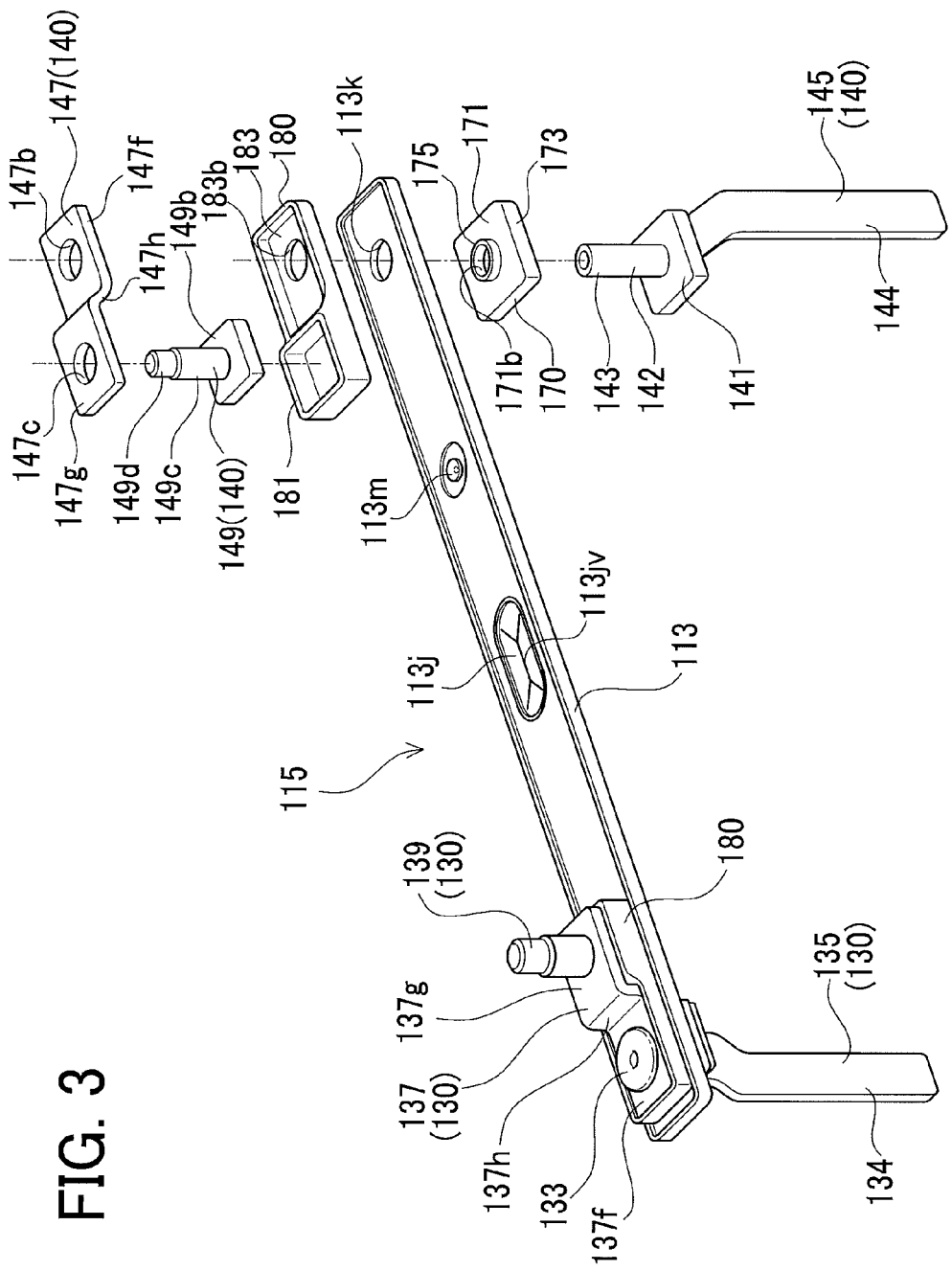
FIG. 3 is a view showing a lid subassembly of the embodiment.

FIG. 1 is a vertical cross-section view of a battery 100 of the present embodiment. FIG. 2 is an enlarged view of a section B and a section C in FIG. 1. It is to be noted that different parts or components in the section C from those in the section B are assigned parenthesized reference signs in FIG. 2. FIG. 3 is a perspective view of a lid subassembly 115 partly exploded, the lid subassembly 115 being to be assembled in the battery 100 shown in FIG. 1.

The battery 100 of the present embodiment is a lithium ion secondary battery including, as shown in FIG. 1, a case body 111 of a rectangular box shape having an opening 111d, and an electrode body 150 housed in the case body 111. The battery 100 further includes a plate-shaped case lid 113 that closes the opening 111d of the case body 111. The case body 111 and the case lid 113 are integrally welded to each other, forming a battery case 110.

The case lid 113 is made of metal (aluminum in the present embodiment) in a rectangular plate-like shape and is formed with circular through holes 113h, 113k each penetrating through the case lid 113 at both ends in a longitudinal direction thereof (a right-left, or horizontal, direction in FIG. 1). The case lid 113 is further provided, at its center in the longitudinal direction, with a safety valve 113j. This safety valve 113j is formed integral with the case lid 113 to constitute a part of the case lid 113.

The safety valve 113j is formed to be thinner than other portions of the case lid 113 and is formed, on its upper surface, with a groove 113jv (see FIG. 3). Specifically, the safety valve 113j is configured such that the groove 113jv ruptures or breaks when the internal pressure of the battery case 110 reaches a predetermined pressure, thereby allowing gas in the battery case 110 to release out.

The case lid 113 is formed, between the safety valve 113j and the through hole 113k, with a liquid inlet 113l1 (see FIG. 1) through which electrolyte (not shown) is poured into the battery case 110. This liquid inlet 113n is sealed with a plug 113m.

The electrode body 150 is a wound electrode body of a flattened shape, formed of a positive electrode sheet, a negative electrode sheet, and separators, which are wound together into a flattened shape. The positive electrode sheet includes a positive substrate made of aluminum foil and positive mixture layers placed each on part of each surface of this substrate. The positive mixture layers contain positive active material, electrically conductive material made of acetylene black, and PVDF (binder). The negative electrode sheet includes a negative substrate made of copper foil and negative mixture layers placed each on part of each surface of this substrate. The negative mixture layers contain negative active material, SBR (binder), and CMC (thickener). The separators made of porous polypropylene resin sheets. The above materials of the positive electrode sheet, positive active material, negative electrode sheet, negative active material, and separators are mere examples and may be appropriately selected from ones generally used for lithium secondary batteries.

Of the positive substrate of the positive electrode sheet (the negative substrate of the negative electrode sheet), a portion coated with the positive mixture layers (the negative mixture layers) is referred to as a mixture coated part, while a portion not coated with the positive mixture layers (the negative mixture layers) is referred to as a mixture uncoated part. The electrode body 150 is configured such that the mixture uncoated part 151b of the positive electrode sheet is exposed at one end in a winding axis direction (the horizontal direction in FIG. 1) and a mixture uncoated part 158b of the negative electrode sheet is exposed at the other end.

The battery 100 further includes an electrode terminal unit (a positive terminal unit 130 and a negative terminal unit 140) that is connected to the electrode body 150 in the case body 111 and extends out through the through hole 113h or 113k of the case lid 113.

The positive terminal unit 130 consists of a positive current collector terminal member 135, a positive outer terminal member 137, and a positive fastening member 139 (bolt) (see FIGS. 1 and 3). The current collector terminal member 135 is made of metal (aluminum in the present embodiment) having one end connected to the electrode body 150 and the other end extending out through the through hole 113h of the case lid 113. The outer terminal member 137 is made of metal, placed on the case lid 113 (outside the battery case 110) and electrically connected to the current collector terminal member 135 outside the battery case 110. The fastening member 139 is made of metal, placed on the case lid 113 (outside the battery case 110) and electrically connected to the outer terminal member 137.

To be concrete, the positive current collector terminal member 135 includes a collector head portion 131, an insertion part 132, and a current collector body 134, and a deformed part 133 (see FIGS. 1 to 3). The head portion 131 has a rectangular plate-like shape and located inside the case body 111. The insertion part 132 has a columnar shape protruding from an upper surface 131f of the head portion 131 and extending through the through hole 113h of the case lid 113. The deformed part 133 is a portion continuous with an upper end of the insertion part 132 and formed by caulking or riveting (an upper end portion of the insertion part 132 is deformed to widen in diameter) into a circular disc shape, and electrically connected to the positive outer terminal member 137. The current collector body 134 extends from a lower surface 131b of the head portion 131 toward a bottom 111b of the case body 111 and is welded to the mixture uncoated part 151b of the positive electrode sheet of the electrode body 150. Accordingly, the positive current collector terminal member 135 and the electrode body 150 are electrically and mechanically connected to each other.

The positive outer terminal member 137 has a nearly Z shape in side view. This terminal member 137 includes a fixed part 137f fixed by the deformed part 133, a connection part 137g connected to the fastening member 139, and a joint part 137h joining the fixed part 137f and the connection part 137g. The fixed part 137f is formed with a through hole 137b penetrating therethrough. In this through hole 137b, the insertion part 132 of the positive current collector terminal member 135 is inserted. The connection part 137g is also formed with a through hole 137c penetrating therethrough.

The positive fastening member 139 is a metal bolt that includes a rectangular plate-shaped head portion 139b and a columnar shaft portion 139c. The shaft portion 139c includes a distal end portion formed with screw threads 139d. The shaft portion 139c of the fastening member 139 is inserted in the through hole 137c of the positive outer terminal member 137.

The negative terminal unit 140 consists of a negative current collector terminal member 145, a negative outer terminal member 147, and a negative fastening member 149 (bolt) (see FIGS. 1 and 3). The current collector terminal member 145 is made of metal (copper in the present embodiment) having one end connected to the electrode body 150 and the other end extending out through the through hole 113k of the case lid 113. The outer external terminal 147 is made of metal, placed on the case lid 113 (outside the battery case 110) and electrically connected to the current collector terminal member 145 outside the battery case 110. The fastening member 149 is made of metal, placed on the case lid 113 (outside the battery case 110) and electrically connected to the outer terminal member 147.

To be concrete, the negative current collector terminal member 145 includes a collector head portion 141, an insertion part 142, a current collector body 144, and a deformed part 143 (see FIGS. 1 to 3). The head portion 141 has a rectangular plate-like shape and located inside the case body 111. The insertion part 142 has a columnar shape protruding from an upper surface 141f of the head portion 141 and extending through the through hole 113k of the case lid 113. The deformed part 143 is a portion continuous with an upper end of the insertion part 142 and formed by caulking or riveting (an upper end portion of the insertion part 142 is deformed to widen in diameter) into a circular disc shape, and electrically connected to the positive outer terminal member 147. The current collector body 144 extends from a lower surface 141b of the collector head portion 141 toward the bottom 111b of the case body 111 and is welded to the mixture uncoated part 158b of the negative electrode sheet of the electrode body 150. Accordingly, the negative current collector terminal member 145 and the electrode body 150 are electrically and mechanically connected to each other.

The negative outer terminal member 147 has a nearly Z shape in side view. This terminal member 147 includes a fixed part 147f fixed by the deformed part 143, a connection part 147g connected to the fastening member 149, and a joint part 147h joining the fixed part 147f and the connection part 147g. The fixed part 147f is formed with a through hole 147b penetrating therethrough. In this through hole 147b, the insertion part 142 of the negative current collector terminal member 145 is inserted. The connection part 147g is also formed with a through hole 147c penetrating therethrough.

The negative fastening member 149 is a metal bolt that includes a rectangular plate-shaped head portion 149b and a columnar shaft portion 149c. This shaft portion 149c includes a distal end portion formed with screw threads 149d. The shaft portion 149c of the fastening member 149 is inserted in the through hole 147c of the negative outer terminal member 147.

The battery 100 further includes a gasket 170 interposed between the positive terminal unit 130 (i.e., the positive current collector terminal member 135) and the case lid 113 to electrically insulate and seal them from each other. Another gasket member 170 is also interposed between the negative terminal unit 140 (i.e., the negative current collector terminal member 145) and the case lid 113.

To be concrete, each gasket 170 is made of electrically insulating resin (PFA (perfluoroalkyl vinyl ether copolymer) in the present embodiment) and includes a body part 171, an outside burring portion 173, and an inside burring portion 175 (see FIGS. 2 and 3). The body part 171 has a rectangular flat-plate shape formed, at its center, with a circular through hole 171b in which the insertion part 132 (the insertion part 142) of the positive terminal unit 130 (the negative terminal unit 140) is inserted. The body part 171 is interposed between the upper surface 131f (the upper surface 141f) of the collector head portion 131 (the collector head portion 141) of the positive terminal unit 130 (the negative terminal unit 140) and the lower surface 113c of the case lid 113.

The outside burring portion 173 is a rectangular-annular side wall located on the circumferential edge of the body part 171 and protruding from the lower surface 171g of the body part 171. This outside burring portion 173 surrounds an outer side surface 131g (an outer side surface 141g) of the collector head portion 131 (the collector head portion 141). The outside burring portion 173 ensures a creepage distance between the lower surface 113c of the case lid 113 and the outer side surface 131g (the outer side surface 141g) of the collector head portion 131 (the collector head portion 141).

The inside burring portion 175 is of a cylindrical shape protruding from an upper surface 171f of the body part 171 and placed in the through hole 113h (the through hole 113k) of the case lid 113. In a cylindrical hole of this inside burring portion 175, the insertion part 132 of the positive terminal unit 130 (the insertion part 142 of the negative terminal unit 140) is inserted. The inside burring portion 175 provides electrical insulation between the case lid 113 and the insertion part 132 of the positive terminal unit 130 (the insertion part 142 of the negative terminal unit 140).

Furthermore, the battery 100 includes an insulator 180 made of electrically insulating resin and is placed on the case lid 113. The insulator 180 is interposed between the positive terminal unit 130 (i.e., the positive outer terminal member 137 and the positive fastening member 139) and the case lid 113 and provides electrical insulation between them. Another insulator 180 is also interposed between the negative terminal unit 140 (i.e., the negative outer terminal member 147 and the negative fastening member 149) and the case lid 113.

Concretely, the insulator 180 includes a head placing part 181 in which the head portion 139b of the positive fastening member 139 (the head portion 149b of the negative fastening member 149) is placed and a fastening placing part 183 in which the fixed part 137f of the positive outer terminal member 137 (the fixed part 147f of the negative outer terminal member 147) is placed. The fastening placing part 183 is formed with a through hole 183b penetrating therethrough, in which the insertion part 132 of the positive terminal unit 130 (the insertion part 142 of the negative terminal unit 140) is inserted.

In the present embodiment, the case lid 113, the electrode terminal units (the positive terminal unit 130 and the negative terminal unit 140), the gaskets 170, 170, and the insulators 180, 180 constitute the lid subassembly 115. Specifically, the positive outer terminal member 137, the insulator 180, the case lid 113, and the gasket 170 are held and fixed between the deformed part 133 and the collector head portion 131 of the positive terminal unit 130, while the negative outer terminal member 147, the insulator 180, the case lid 113, and the gasket 170 are held and fixed between the deformed part 143 and the collector head portion 141 of the negative terminal unit 140. The thus integrally assembled components constitute the lid subassembly 115.

In the lid subassembly 115, the body part 171 of the gasket 170 is sandwiched between the upper surface 113f (the upper surface 141f) of the collector head portion 131 (the collector head portion 141) of the positive terminal unit 130 (the negative terminal unit 140) and the lower surface 113c of the case lid 113 in an elastically compressed state in its own thickness direction (an upper-lower, or vertical, direction in FIG. 2). The inside burring portion 175 of the gasket 170 is further elastically compressed in its own axis direction (the vertical direction in FIG. 2) and a distal end 175b is in close contact with the insulator 180.

[Details of Case Lid]

Figure 4:
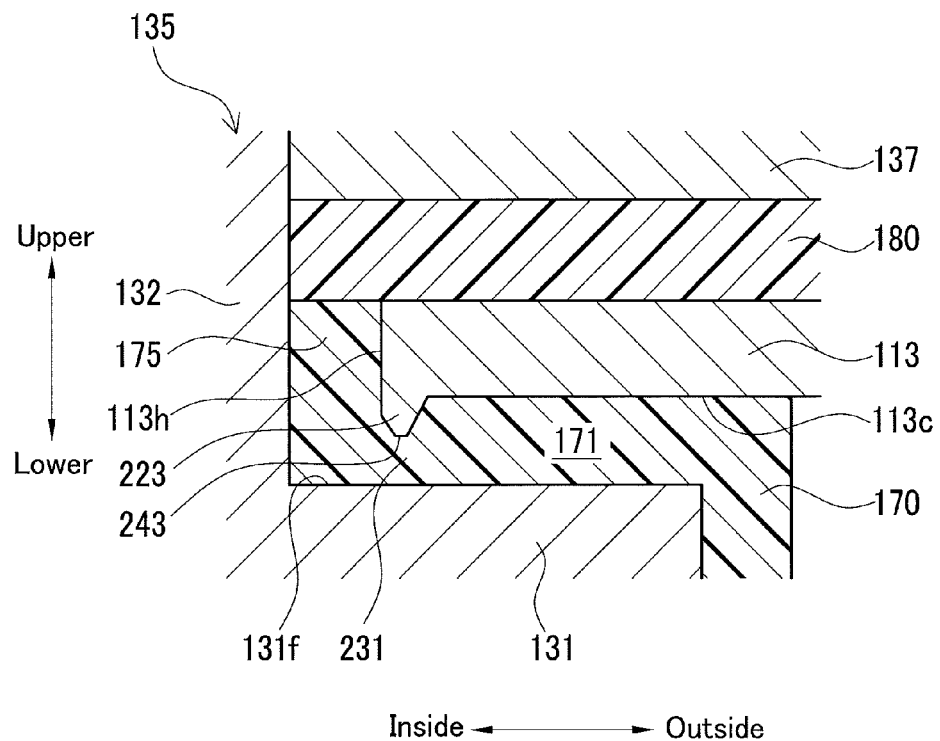
FIG. 4 is an explanatory enlarged view showing a gasket and surrounding parts thereof.

Next, an area fixed by caulking or riveting of the positive current collector terminal member 135 will be further explained in detail referring to FIG. 4. FIG. 4 shows a part of the battery 100 as a completed product. The following explanation is made on only the positive terminal; however, the same applies to the negative terminal.

As shown in FIG. 2, a plurality of components including the case lid 113 are clamped between the deformed part 133 and the collector head portion 131 of the positive current collector terminal member 135. The caulking direction of the deformed part 133 corresponds to the thickness direction of the case lid 113. Hereinafter, this direction is simply referred to as an upper-lower, or vertical, direction. The deformed part 133 is formed above the case lid 113 and outside the case lid 113 with respect to the battery 100 as shown in FIG. 1.

Overlapping portions of the components fixed by the deformed part 133 are shown in a more enlarged view in FIG. 4. An upper-lower, or vertical, direction in FIG. 4 corresponds to the aforementioned vertical direction. At a left end in FIG. 4, a part of the insertion part 132 of the positive current collector terminal member 135 appears. The center axis of the insertion part 132 is a center axis AX as shown in FIG. 2. A direction perpendicular to the center axis AX and the insertion part 132 is referred to as an inside-outside direction. Hereinafter, a side close to the insertion part 132 is assumed as the inside while a side far from the insertion part 132 is assumed as the outside. In FIG. 4, a left side in the figure corresponds to the inside, and a right side in the figure corresponds to the outside.

As shown in FIG. 4, on the outside of the insertion part 132, the positive outer terminal member 137, the insulator 180, the case lid 113, the gasket 170, and the collector head portion 131 are stacked in this order from above. The case lid 113 is sandwiched between the insulator 180 and the gasket 170 and is not in contact with the positive current collector terminal member 135 and the positive outer terminal member 137.

The lower surface 113c of the case lid 113 is formed with a protrusion 223 protruding downward. This protrusion 223 is formed on an innermost side of the case lid 113 as shown in FIG. 4. The protrusion 223 is formed extending downward from an inner wall surface of the through hole 113h of the case lid 113 and over the entire circumference, taking the nearly cylindrical shape.

Of the gasket 170, an annular range clamped between and strongly pressed by the protrusion 223 and the upper surface 131f of the collector head portion 131 is a sealing part 231. This sealing part 231 of the gasket 170 is in a more highly compressed state than a surrounding area around the sealing part 231. The sealing part 231 reliably provides a seal over the entire circumference of the through hole 113h of the case lid 113.

Furthermore, as shown in FIG. 4, the inside burring portion 175 of the gasket 170 is interposed between the through hole 113h of the case lid 113 and the insertion part 132 in the inside-outside direction. The inside burring portion 175 is located more inside than the sealing part 231 in the gasket 170 and surrounds the entire circumference of the insertion part 132 of the positive current collector terminal member 135. Accordingly, the case lid 113 and the insertion part 132 are insulated from each other by the inside burring portion 175. The protrusion 223 of the case lid 113 surrounds the insertion part 132 in the circumferential direction through the gasket 170.

Figure 5:
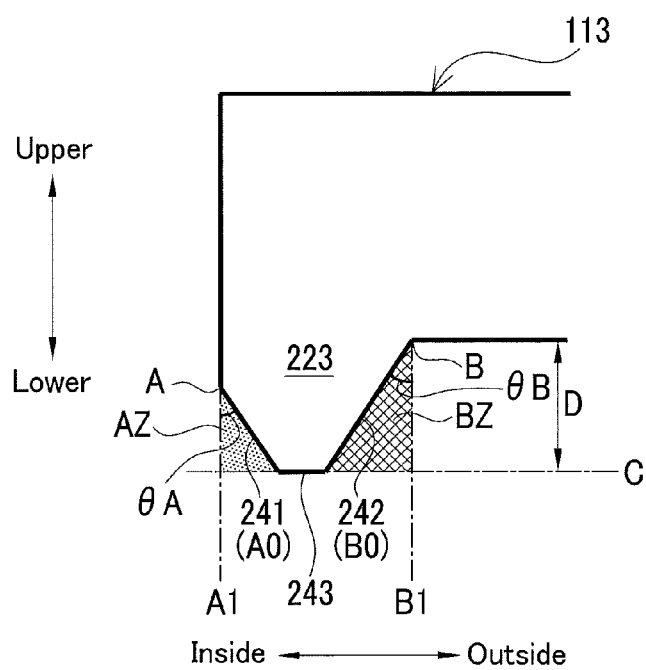
FIG. 5 is an explanatory view showing a shape of a protrusion.

FIG. 5 shows an enlarged sectional shape of the protrusion 223. This figure shows the vertical cross-section shape of the protrusion 223 taken along the center axis of the insertion part 132. As shown in FIG. 5, the protrusion 223 is formed with a tapered surface 241 on an inner circumferential side (corresponding to an inner tapered surface) and a tapered surface 242 on an outer circumferential side (corresponding to an outer tapered surface). A top surface 243 is positioned between the tapered surfaces 241 and 242, forming a top portion of the protrusion 223. This top surface 243 is a surface perpendicular to the vertical direction.

The tapered surface 241 is a circular truncated conical surface extending inward and upward from an inside edge of the top surface 243. The tapered surface 242 is a circular truncated conical surface extending outward and upward from an outside edge of the top surface 243. In the battery 100 of the present embodiment, as shown in FIG. 5, the tapered surface 241 and the tapered surface 242 are not symmetrical in vertical cross-section. A first line segment A0 defined in the vertical cross-section of the tapered surface 241 and a second line segment B0 defined in the vertical cross-section of the tapered surface 242 are different in both or one of inclination and length.

Each point and each line are defined as below. It is assumed that the upper end of the first line segment A0 is a point A and the upper end of the second line segment B0 is a point B. The point B in the present embodiment is located on the lower surface 113c of the case lid 113 (see FIG. 4). Furthermore, as shown in FIG. 5, imaginary straight lines A1, B1, and C are assumed. The straight line A1 is a line extended downward from the upper end (point A) of the first line segment A0. The straight line B1 is a line extended downward from the upper end (point B) of the second line segment BO. The straight line C is a straight line extended from the top surface 243 in the vertical cross-section in the inside-outside direction. A triangular region surrounded by the first line segment A0, the straight line A1, and the straight line C is an imaginary region AZ. In the figure, the imaginary region AZ is indicated with a dot hatch pattern. A triangular region surrounded by the second line segment B0, the straight line B1, and the straight line C is an imaginary region BZ. In the figure, the imaginary region BZ is indicated with a cross hatch pattern. The straight line Al corresponds to a first imaginary line, the straight line C corresponds to a second imaginary line, and the straight line B1 corresponds to a third imaginary line. Furthermore, the imaginary region AZ corresponds to a first imaginary region and the imaginary region BZ corresponds to a second imaginary region, respectively.

In the battery 100 of the present embodiment, as shown in FIG. 5, the area of the imaginary region AZ is smaller than the area of the imaginary region BZ. The length of the first line segment A0 is shorter than the length of the second line segment B0. Further, the position of the point A in the vertical direction is located lower than the position of the point B in the vertical direction. An inclination angle of the first line segment A0 and an inclination angle of the second line segment B0 with respect to the vertical direction are each preferably set in a range of 30° to 50°.

The gasket 170 in the present embodiment is made of fluorine resin, or PFA, as mentioned above. The positive current collector terminal member 135, the case lid 113, and the positive outer terminal member 137 are all made of aluminum MFR (melt float rate) of this gasket 170 is in a range of 1.5 to 2.5.

[Caulking Step]

Manufacture of the battery 100 will be explained below. As described above, as a part of a manufacturing process of the lid subassembly 115, a caulking step of forming the deformed part 133 by radially widening the end portion of the positive current collector terminal member 135. In this caulking step, as shown in FIG. 3, the positive current collector terminal member 135, the gasket 170, the case lid 113, the insulator 180, the positive fastening member 139, and the positive outer terminal member 137 are stacked in this order from below, and then the upper end portion of the current collector terminal member 135 is deformed by caulking or riveting.

The caulking step to be performed in the manufacturing process of the battery 100 of the present embodiment will be explained. In the present manufacturing process, the caulking step is performed by rotary caulking. The rotary caulking is a technique of widening a distal end portion of the insertion part by moving a caulking tool spirally outward from a position close to the center axis while pressing down the caulking tool against the distal end portion of the insertion part.

Figure 6:
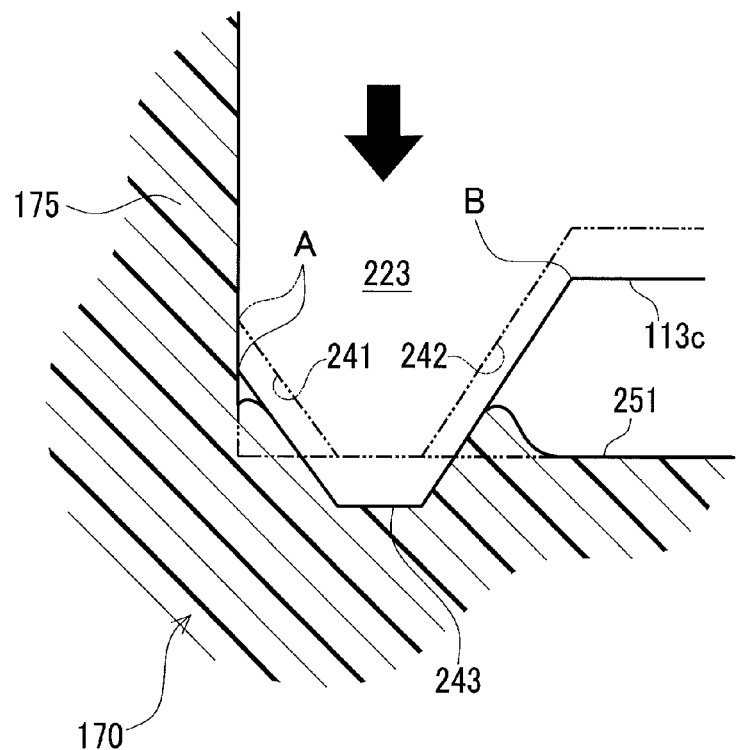
FIG. 6 is an explanatory view showing a shape of a gasket in a halfway condition in a caulking step.

When the gasket 170 and the case lid 113 are simply stacked one on the other, the top surface 243 of the protrusion 223 of the case lid 113 contacts with the upper surface of the gasket 170 as indicated by a double dashed line in FIG. 6, and the lower surface 113c of the case lid 113 is spaced apart from the upper surface 251 of the gasket 170. Further, gaps are formed each between the tapered surface 241 and the upper surface 251 of the gasket 170 and between the tapered surface 242 and the upper surface 251.

The gasket 170 of the present embodiment includes the inside burring portion 175. Thus, in the simply stacked state, the upper end (the line formed by continuous points A) of the tapered surface 241 is placed in contact with or adjacent to the inside burring portion 175 as indicated by a double dashed line in FIG. 6. Since the area of the imaginary region AZ is smaller than the area of the imaginary region BZ as described above, the volume of the space formed under the tapered surface 241 with respect to the gasket 170 is smaller than the volume of the space formed under the tapered surface 242 with respect to the gasket 170.

When the caulking step is started, the distal end portion of the insertion part 132 is first depressed downward with the caulking tool. Thus, the case lid 113 is pressed downward through the positive outer terminal member 137 and the insulator 180 (see FIG. 2). Then, as shown in FIG. 6, the top surface 243 bites down into the gasket 170 and also the sealing part 231 of the gasket 170 is clamped between the top surface 243 and the upper surface 131f of the collector head portion 131, so that the sealing part 231 is compressed (see FIG. 4).

The protrusion 223 of the present embodiment is formed with the tapered surfaces 241 and 242 on both sides of the top surface 243, thereby generating gaps with respect to the gasket 170 as described above. Accordingly, when the protrusion 223 is pushed down in the caulking step, a part of the gasket 170 is extruded from under the top surface 243 as indicated by a solid line in FIG. 6, and escapes along the tapered surfaces 241 and 242 into the spaces under the tapered surfaces 241 and 242.

When the protrusion 223 is pushed down more deeply than the position indicated by the solid line in FIG. 6 until the point A reaches the upper surface 251 of the gasket 170, the entire tapered surface 241 comes to a position inside the gasket 170. That is, the gap between the tapered surface 241 and the upper surface 251 of the gasket 170 disappears. Thus, the space defined by the continuous imaginary region AZ is filled with the gasket 170. At that time, since the point B is located higher than the point A, a gap is still left in an outside imaginary space defined by the continuous imaginary region BZ.

In the caulking step in the present embodiment, the rotary caulking is performed. Accordingly, at an initial stage of the caulking step, a relatively inside portion is relatively more strongly pressed. At a final stage of the caulking step, a relatively outside portion is relatively more strongly pressed. The outer diameter of the deformed part 133 is larger than the outer diameter of the protrusion 223 as shown in FIG. 2, so that the case lid 113 on the outside portion than the protrusion 223 is subjected to a larger pressing force at the final stage of the caulking step.

The protrusion 223 of the present embodiment is configured such that the sectional area of the imaginary region AZ is smaller than the sectional area of the imaginary region BZ as mentioned above and thus the imaginary region AZ is filled earlier than the imaginary region BZ. At the final stage of the caulking step, a range of the gasket 170 located more inside than the top surface 243 of the protrusion 223 is more strongly compressed than a range of the gasket 170 more outside than the top surface 243. Therefore, even when the range more outside the protrusion 223 is pressed, the protrusion 223 is less likely to incline inward.

Specifically, when the case lid 113 and the gasket 170 are pressed down in the vertical direction in the caulking step, the gasket 170 fills the space more inside than the top surface 243 earlier than the space more outside than the top surface 243. Subsequent pressing after the inside is filled causes the gasket 170 to be more strongly compressed on the inside than on the outside. This can suppress deformation of the case lid 113.

The present inventor carried out an experiment to investigate the presence/absence of a gap(s) generated between the gasket 170 and the case lid 13 in the battery 100 of the present embodiment by changing a relationship between the length of the second line segment B0 of the protrusion 223 and the height D (see FIG. 5) of the protrusion 223. Results thereof are shown in the following Table 1.

TABLE 1

| | Length of Second Line Segment B0 of Outside Tapered Surface/ Height D of Protrusion | Presence/Absence of Gap |
|---|---|---|
| Example 1 | 1.15 | Absence |
| Example 2 | 1.4 | Absence |
| Example 3 | 2.0 | Absence |
| Comparative Example 1 | 1.0 | Presence |

As shown in Table 1, when the length of the second line segment B0 of the outside tapered surface 242 in vertical cross-section is 1.15 times larger than the height D of the protrusion 223, appropriate sealing was confirmed without gap between the gasket 170 and the case lid 113.

In this experiment, as the material of the gasket 170, PFA having a MFR of 1.5 to 2.5 is adopted. If a material having a higher molecular weight is selected as PFA to enhance creep performance of the gasket 170, the traceability to the shape of the protrusion 223 may deteriorate. It is therefore preferable to use PFA in the above range.

In the battery 100 of the present embodiment, furthermore, it is more preferable to perform an annealing step after the caulking step. For instance, the lid subassembly 115 (see FIG. 3) integrally assembled with the case lid 113 in the caulking step is annealed at a temperature in a range of 220 to 250° C. for 2 seconds or less. Accordingly, the surface of the gasket 170 and other components contacting with the gasket 170 confirm well to each other, resulting in increased gastightness.

Figure 7:
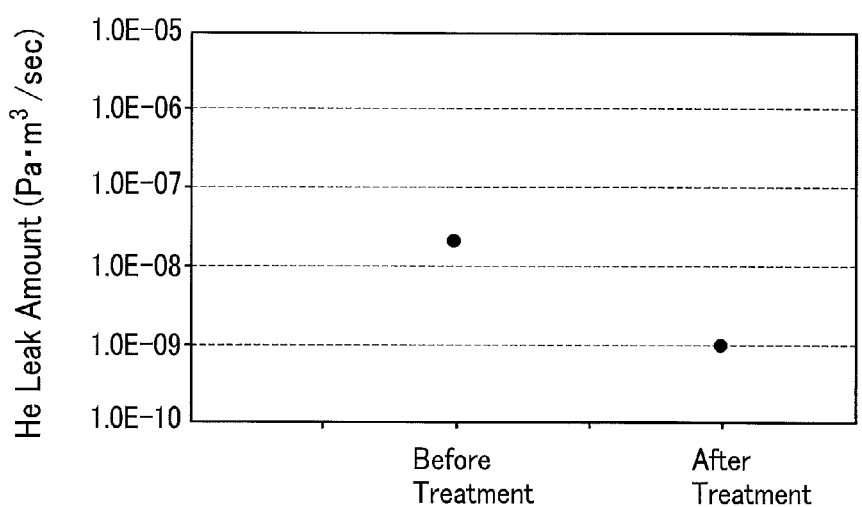
FIG. 7 is a graph showing evaluation results of gastightness before and after annealing treatment.

FIG. 7 shows evaluation results on gastightness before and after the annealing treatment performed at 220° C. for 1 second. An evaluation method was a He leak test using M-222LD by Canon Anelva Corporation as a He leak detector. As illustrated, a He leak amount per second before the treatment was larger than $1.0 \times 10^{-8}$ (Pa·m$^3$) but decreased to about $1.0 \times 10^{-9}$ (Pa·m$^3$). This test reveals that the gastightness could be enhanced by the annealing treatment.

According to the battery 100 as explained above in detail, pressure contact of the protrusion 223 of the case lid 113 and the sealing part 231 of the gasket 170 seals between the inside and the outside of the battery. Further, since the protrusion 223 includes the tapered surfaces 241 and 242 and the area of the imaginary region AZ generated under the tapered surface is smaller than the area of the imaginary region BZ, the space or region on the inside of the protrusion 223 is filled first. In other words, the gasket 170 on the inside of the protrusion 223 is more strongly compressed than on the outside. Thus, the case lid 113 can be suppressed from being deformed. Consequently, the battery 100 of the present embodiment is expected as a battery 100 with a seal structure including the sealing part 231 of a high compression rate in the gasket 170 to reduce caulking failures.

The present embodiment is a mere example and does not limit the present invention. Thus, the present invention may be embodied in other specific forms without departing from the essential characteristics thereof. For instance, the present invention is applicable not only to the battery 100 for vehicles but also to batteries for home use. The invention is also applicable to primary batteries as well as the secondary batteries.

Furthermore, for example, a method for providing the area of the imaginary region BZ larger than the area of the imaginary region AZ is not limited to shortening the length of the first line segment A0 than the length of the second line segment B0. For instance, when the inclination angle of the first line segment A0 with respect to the vertical direction is made very large, it is possible to increase the area of the imaginary region BZ than the area of the imaginary region AZ even when the first line segment A0 is not shorter than the length of the second line segment B0.

In the present embodiment, furthermore, the upper end (the point B) of the outside tapered surface 242 is located on the lower surface 113c of the case lid 113. As an alternative, the point B may be located at a position slightly lower than the lower surface 113c by designing the outside surface of the protrusion 223 to vertically protrude from the lower surface 113c. In this case, however, an additional corner is generated between the upper end of the protrusion 223 and the lower surface 113c in addition to the point B. Thus, a gap is more likely to be generated than in the above embodiment. To avoid such a situation, it is preferable that the point B is located on the lower surface 113c (see FIG. 4) of the case lid 113.

For instance, furthermore, the protrusion 223 is formed extending downward from the inner wall surface of the through hole 113h of the case lid 113, but is not limited thereto. The protrusion may be a protrusion protruding downward from a portion of the lower surface of the lid at a position more outside than the inner wall surface. In the above embodiment, the tapered surfaces are formed with straight lines in vertical cross-section, but may be formed with smooth curved lines.

REFERENCE SIGNS LIST

100 Battery
110 Battery case
111d Opening
113 Case lid
132 Insertion part
133 Deformed part

134 Current collector body
135 Positive current collector terminal member
150 Electrode body
223 Protrusion
241, 242 Tapered surface
243 Top surface

The invention claimed is:

1. A battery including:
a power generating element;
a case having an opening and housing the power generating element;
a lid member welded to the opening of the case to close the opening;
a current collector terminal member including: a current collector part having one end electrically connected to the power generating element and another end facing the lid member; and an insertion part having one end electrically connected to the current collector part and another end inserted through and extended out of the lid member in a vertical direction corresponding to a thickness direction of the lid member, the other end of the insertion part including a deformed part widened in diameter by caulking and electrically connected to an outer connecting terminal; and
a gasket placed in contact with a lower surface of the lid member to seal between the lid member and the current collector terminal member, wherein
the lid member includes a protrusion protruding downward from the lower surface in the vertical direction and surrounding the insertion part in a circumferential direction through the gasket, and
the protrusion has a top portion including:
an inner tapered surface located on a side close to the insertion part in an inside-outside direction corresponding to a direction perpendicular to the vertical direction;
an outer tapered surface located on an opposite side to the insertion part side in the inside-outside direction; and
a top surface configured as a surface perpendicular to the vertical direction between the inner tapered surface and the outer tapered surface, wherein
the protrusion forms a first imaginary region and a second imaginary region in a vertical cross-section including an axis center of the insertion part in the vertical direction;
the first imaginary region is surrounded by a first line segment defined in a vertical cross-section of the inner tapered surface, a first imaginary line extending downward from an uppermost point of the first line segment in the vertical direction, and a second imaginary line extending from a vertical cross-section of the top surface in the inside-outside direction;
the second imaginary region is surrounded by a second line segment defined in a vertical cross-section of the outer tapered surface, a third imaginary line extending downward from an uppermost point of the second line segment in the vertical direction, and the second imaginary line; and
the first imaginary region has a smaller area than the second imaginary region.

2. The battery according to claim 1, wherein
the inner tapered surface and the outer tapered surface are equal in inclination angle, and
the first line segment is shorter in length than the second line segment.

* * * * *